US010684665B2

(12) United States Patent
Badenes et al.

(10) Patent No.: US 10,684,665 B2
(45) Date of Patent: Jun. 16, 2020

(54) AUTOMATED MOBILE DEVICE CHARGING DETECTION

(71) Applicant: INTERNATIONAL BUSINESS MACHINES CORPORATION, Armonk, NY (US)

(72) Inventors: Hernan Badenes, S. M. Andes (AR); Mateo N. Bengualid, Cordoba (AR); Agustin A. Casamayor, Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 15/897,588

(22) Filed: Feb. 15, 2018

(65) Prior Publication Data

US 2019/0250684 A1  Aug. 15, 2019

(51) Int. Cl.
| G06F 1/28 | (2006.01) |
| H02J 7/02 | (2016.01) |
| H02J 7/00 | (2006.01) |
| G06F 1/30 | (2006.01) |

(52) U.S. Cl.
CPC ............... G06F 1/28 (2013.01); G06F 1/30 (2013.01); H02J 7/0047 (2013.01); H02J 7/025 (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| 3,889,248 A | 6/1975 | Ritter |
| 6,304,060 B1 | 10/2001 | Dernehl |
| 7,843,167 B2 | 11/2010 | Derome et al. |
| 8,130,110 B2 | 3/2012 | Monks et al. |
| 9,294,142 B2 | 3/2016 | Nakahara |

FOREIGN PATENT DOCUMENTS

JP  09191334  7/1997

OTHER PUBLICATIONS

Lee, Cody; Unpower tweak alerts you when device gets uplugged; http://www.idownloadblog.com/2013/02/23/unpower-jailbreak-tweak/; Feb. 23, 2013; 5 pages.

*Primary Examiner* — Zahid Choudhury
(74) *Attorney, Agent, or Firm* — Schmeiser, Olsen & Watts; Mark C. Vallone

(57) ABSTRACT

A method and system for improving an automated mobile device charging detection system is provided. The method includes automatically detecting a connection between a mobile device and a charging apparatus. A voltage signal between the charging apparatus and circuitry of the mobile hardware device is detected via a hardware sensor that includes a motion sensor for charging attempt detection. A specified time period is determined to have elapsed since detecting the voltage signal and a subsequent loss of the voltage signal between the charging apparatus and the circuitry of the mobile hardware device is detected. In response, a notification indicating the loss of the voltage signal is presented to a user.

20 Claims, 5 Drawing Sheets

AUTOMATED MOBILE DEVICE CHARGING DETECTION

FIELD

The present invention relates generally to a method for automatically detecting mobile hardware device charging and in particular to a method and associated system for improving mobile hardware device charging detection technology associated with detecting voltage signal interruptions via multiple hardware sensors of a mobile hardware device.

BACKGROUND

Accurately detecting a power loss for a device typically includes an inaccurate process with little flexibility. Determining faulty power connections to a devices may include a complicated process that may be time consuming and require a large amount of resources. Accordingly, there exists a need in the art to overcome at least some of the deficiencies and limitations described herein above.

SUMMARY

A first aspect of the invention provides an automated mobile device charging detection improvement method comprising: automatically detecting, by a processor of a mobile hardware device of a user, a first connection to a charging apparatus; automatically detecting, by the processor via a hardware sensor of the mobile hardware device, a voltage signal between the charging apparatus and circuitry of the mobile hardware device, wherein the hardware sensor comprises a motion sensor for charging attempt detection; determining, by the processor, that a specified time period has elapsed since the automatically detecting the voltage signal; automatically detecting, by the processor via the hardware sensor of the mobile hardware device, a loss of the voltage signal between the charging apparatus and the circuitry of the mobile hardware device; and presenting, by the processor to the user, a notification indicating the loss of the voltage signal between the charging apparatus and the circuitry of the mobile hardware device.

A second aspect of the invention provides a computer program product, comprising a computer readable hardware storage device storing a computer readable program code, the computer readable program code comprising an algorithm that when executed by a processor of a mobile hardware device of a user implements an automated mobile device charging detection improvement method, the method comprising: automatically detecting, by the processor, a first connection to a charging apparatus; automatically detecting, by the processor via a hardware sensor of the mobile hardware device, a voltage signal between the charging apparatus and circuitry of the mobile hardware device, wherein the hardware sensor comprises a motion sensor for charging attempt detection; determining, by the processor, that a specified time period has elapsed since the automatically detecting the voltage signal; automatically detecting, by the processor via the hardware sensor of the mobile hardware device, a loss of the voltage signal between the charging apparatus and the circuitry of the mobile hardware device; and presenting, by the processor to the user, a notification indicating the loss of the voltage signal between the charging apparatus and the circuitry of the mobile hardware device.

A third aspect of the invention provides a mobile hardware device comprising a processor coupled to a computer-readable memory unit, the memory unit comprising instructions that when executed by the computer processor implements an automated mobile device charging detection improvement method comprising: automatically detecting, by the processor, a first connection to a charging apparatus; automatically detecting, by the processor via a hardware sensor of the mobile hardware device, a voltage signal between the charging apparatus and circuitry of the mobile hardware device, wherein the hardware sensor comprises a motion sensor for charging attempt detection; determining, by the processor, that a specified time period has elapsed since the automatically detecting the voltage signal; automatically detecting, by the processor via the hardware sensor of the mobile hardware device, a loss of the voltage signal between the charging apparatus and the circuitry of the mobile hardware device; and presenting, by the processor to a user, a notification indicating the loss of the voltage signal between the charging apparatus and the circuitry of the mobile hardware device.

The present invention advantageously provides a simple method and associated system capable of accurately detecting a power loss for a device.

DETAILED DESCRIPTION

Figure 1:
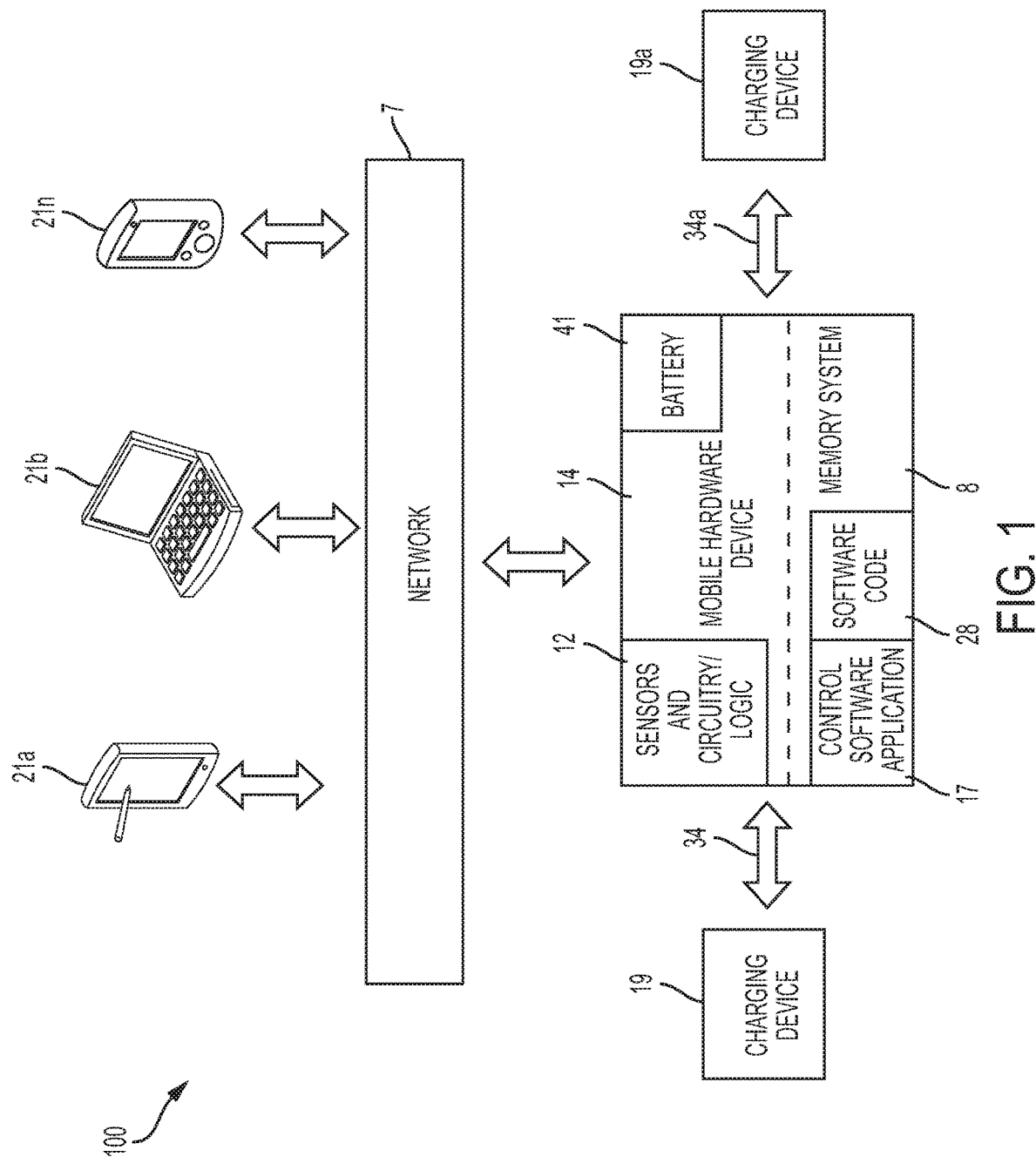
FIG. 1 illustrates a system for improving mobile hardware device charging detection technology associated with detecting and correcting voltage signal interruptions via multiple hardware sensors of a mobile hardware device 14, in accordance with embodiments of the present invention.

FIG. 1 illustrates a system 100 for improving mobile hardware device charging detection technology associated with detecting and correcting voltage signal interruptions via multiple hardware sensors of a mobile hardware device 14, in accordance with embodiments of the present invention. System 100 is enabled to detect voltage interruptions during a charging process executed with respect to mobile hardware devices (e.g., mobile hardware device 14) and present associated warnings to a user. System 100 enables the following example process for detecting an interruption during a charging process:

The process is initiated in response to mobile hardware device 14 (in vibration mode) being connected to charging device 19. In response, a charging system (e.g., sensors and circuitry/logic 12) of mobile hardware device 14 identifies a charging state for mobile hardware device 14. During the charging process, the charging system determines that mobile hardware device 14 remains motionless (e.g., no vibrations are detected). Therefore, the charging system determines that a charging voltage signal (to mobile hardware device 14) has been disabled. In response, mobile hardware device 14 triggers a predetermined configurable alarm to notify the user that the voltage signal has been disabled. The predetermined configurable alarm may include, inter alia, a visual display alarm, an audible alarm, a vibration based alarm, a light based alarm, etc.

System 100 of FIG. 1 includes hardware devices 21*a* . . . 21*n* (e.g., Internet of things (IOT) devices) connected through a network 7 to a mobile hardware device 14. System 100 additionally comprises a charging device 19 and a charging device 19*a* for charging (via a hardwired or wireless connection such as connections 34 or 34*a*) mobile hardware device 14. Mobile hardware device 14 comprises sensors and circuitry/logic 12, a battery 41, and a (specialized) memory system 8. Memory system 8 comprises a control software application 17 and software code 28. Memory system 8 may include a single memory system. Alternatively, memory system 8 may include a plurality of memory systems. Hardware devices 21*a* . . . 21*n* and mobile hardware device 14 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware devices 21*a* . . . 21*n* and mobile hardware device 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-5. The specialized discrete non-generic analog, digital, and logic based circuitry (e.g., sensors and circuitry/logic 12, etc.) may include proprietary specially designed components (e.g., a specialized integrated circuit, such as for example an Application Specific Integrated Circuit (ASIC) designed for only implementing a process for improving mobile hardware device charging detection technology associated with detecting voltage signal interruptions via multiple hardware sensors of mobile hardware device 14. Sensors and circuitry/logic 12 may include sensors including, inter alia, accelerometers (for determining an orientation, a pattern of movement with respect to a charging process, and a location of mobile hardware device), light detection sensors, a barometer sensor, and audio sensors; GPS sensors, optical sensors, temperature sensors, voltage sensors, motion sensors, etc. Sensors and circuitry/logic 12 may include electronic switches (e.g., a relay) for connecting and disconnecting voltage sources (e.g., wired or wirelessly) to mobile hardware device 14 for enabling or disabling a charging process. Network 7 may include any type of network including, inter alia, a local area network, (LAN), a wide area network (WAN), the Internet, a wireless network, etc.

System 100 utilizes sensors and circuitry/logic 12 to enable a user of mobile hardware device 14 identify that mobile hardware device 14 is not being charged during a charging process. Mobile hardware device 14 enables sensors and circuitry/logic 12 comprising, inter alia, an accelerometer to detect an interruption of a charging voltage signal to mobile hardware device 14. For example, if mobile hardware device 14 is connected to charging device 19 (i.e., indicating that a user is initiating a charging process for charging a battery of mobile hardware device 14) and it is detected that mobile hardware device 14 has been moved (e.g., via a motion detector sensor in mobile hardware device) and is currently remaining motionless on a surface of a structure and it is detected that the battery is not being currently charged, an alert is generated (e.g., an audible alert, a visual alert, a vibration based alert, etc.) and presented to the user so that the user may diagnose and correct the charging issue (e.g., plug charging device 19 back into mobile hardware device 14). Additionally, mobile hardware device 14 may be automatically connected to an alternative charging device (e.g., wirelessly to charging device 19*a*)

System 100 enables the following example process for detecting voltage signal interruptions via multiple hardware sensors of a mobile hardware device 14:

Sensors and circuitry/logic 12 detects a connection to charging device 19 at a time T0 and at a time T0+2 seconds. Additionally, sensors and circuitry/logic 12 detects that mobile hardware device 14 is currently positioned (at around time T0+2 seconds) motionless on a table. In response to the aforementioned detections, it is determined that a user is attempting to charge mobile hardware device 14 but a charging voltage signal has been interrupted (e.g., a charging cable is unplugged from mobile hardware device 14). In response, mobile hardware device 14 triggers various alarms to alert the user that the charging voltage signal has been interrupted. For example, alerts may be presented via, inter alia, a display via visible animations, a speaker, and/or lights or LEDs of mobile hardware device 14. In response, the user may verify if the charging cable is properly connected and functional. Alternatively, sensors and circuitry/logic 12 may automatically connect to an alternative charging device (e.g., charging device 19*a*) via wireless or wired (e.g., via usage of a switching circuit) connection means. The following implementation example describes an example process determining and resolving a charging issue with respect to mobile hardware device 14.

The process is initiated when a user: connects a smartphone to an associated charger, places the smartphone on a table, and turns off a light off prior to going to sleep. In response to detecting that the smartphone was disconnected from the associated charger (due to a loose connection) during placement of the smartphone on the table, system 100 alerts the user so that the user may correct the disconnect condition.

System 100 may enable communications between IOT devices 21*a* . . . 21*n* for alerting a user (via any of IOT devices 21*a* . . . 21*n*) that a power disconnect event (with respect to a charging process) has occurred with respect to mobile hardware device 14. For example, a tablet computer (detected to be disconnected from a charging source) may communicate with a cellular telephone configured to display a notification indicating that the charging source has been disconnected from the tablet computer. Alternatively, a centralized hardware device (in a user's home) may be enabled to communicate with the tablet computer and display a notification indicating that the charging source has been disconnected from the tablet computer. Additionally, cognitive or artificial intelligent (self-learning) software code may be generated for enabling mobile hardware device 14 to execute a software code learning (and modification) process for predicting when a user would be likely to charge mobile hardware device 14 (e.g., before going to sleep, placement in a specified location (determined via a proximity to sensors, Bluetooth capable devices, etc.), during a lunch at the office, when a battery charge level is detected to be at 50%, a specified phone position (e.g., a flat position, placement in a stand, etc.), etc. Additional signal processing may be executed for determining that a faulty cable or connector would be likely to connect/disconnect intermittently before being left in a disconnected state. Therefore, detecting a voltage/no voltage/voltage/no voltage state may be used to determine a charging issue for user notification and/or auto connecting to a differing charging source (e.g., automatically connecting to a wireless charging source). Additionally, detecting an input current may be used to enable a process for determining that mobile hardware device 14 has been connected to a charging source but a cable or connector is not supplying a charging voltage.

Figure 2:
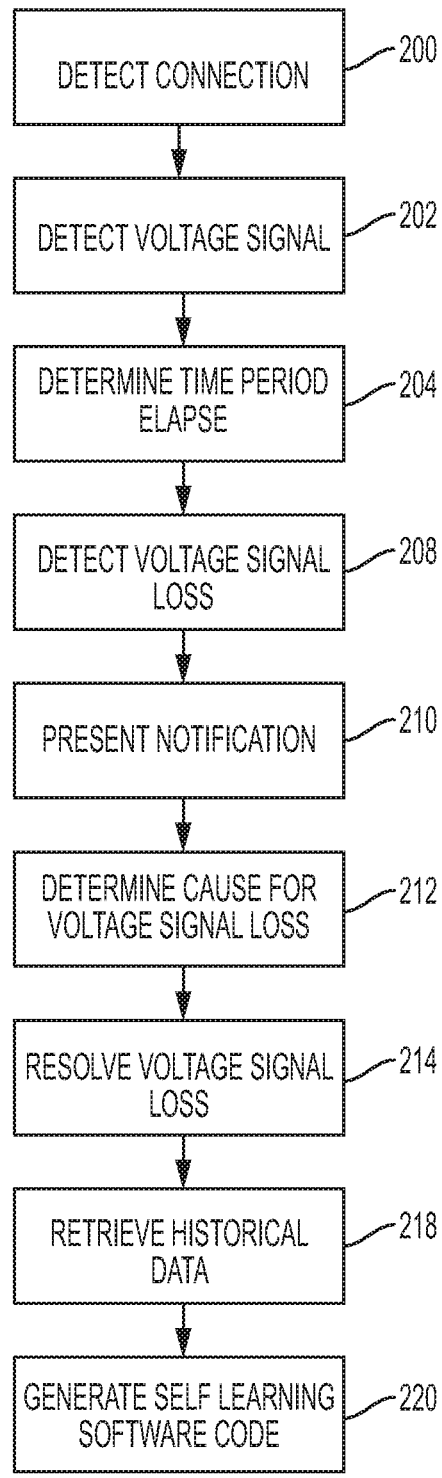
FIG. 2 illustrates an algorithm detailing a process flow enabled by the system of FIG. 1 for improving mobile hardware device charging detection technology associated with detecting and correcting voltage signal interruptions via multiple hardware sensors of a mobile hardware device 14, in accordance with embodiments of the present invention.

FIG. 2 illustrates an algorithm detailing a process flow enabled by system 100 of FIG. 1 for improving mobile hardware device charging detection technology associated with detecting and correcting voltage signal interruptions via multiple hardware sensors of a mobile hardware device 14, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by mobile hardware device 14 and hardware devices 21a . . . 21n of FIG. 1. In step 200, a connection between a mobile hardware device and a charging apparatus is automatically detected. In step 202, a voltage signal between the charging apparatus and circuitry of the mobile hardware device is automatically detected via a hardware sensor(s) of the mobile hardware device. The hardware sensor(s) may include any type of hardware sensor, including, inter alia, a motion sensor for charging attempt detection, a GPS sensor, an optical sensor, an audio sensor, a voltage sensor, a temperature sensor, etc. In step 204, the mobile hardware device detects that a specified time period has elapsed since automatically detecting the voltage signal. In step 208, a loss of the voltage signal between the charging apparatus and the circuitry of the mobile hardware device is automatically detected via the hardware sensor(s) of the mobile hardware device. In step 210, a notification indicating the loss of the voltage signal between the charging apparatus and the circuitry of the mobile hardware device is presented to a user of the mobile hardware device. The notification may be presented via the mobile hardware device. Alternatively, presenting the notification may include automatically connecting the mobile hardware device to an Internet of things (IOT) device of the user and presenting the notification via the IOT device. In step 212, a cause for the voltage signal loss is determined. For example, a faulty connection between the charging apparatus and the circuitry of the mobile hardware device may be determined based on results of detecting the loss of the voltage signal. Alternatively, it may be determined that the charging apparatus has been disabled based on results of detecting the loss of the voltage signal. In step 214, the voltage signal loss is resolved. For example, a wireless charging apparatus located within a charging range of the mobile hardware device is detected and a voltage signal path between the charging apparatus and circuitry of the mobile hardware device is disabled. In response, the wireless charging apparatus is connected to the circuitry of the mobile hardware device and a wireless voltage signal between the wireless charging apparatus and the circuitry of the mobile hardware device is automatically detected via the hardware sensor of the mobile hardware device. In step 218, historical data associated with previous connections between the charging apparatus and the circuitry of the mobile hardware device is retrieved. In response, self-learning computer code is generated based on analysis of the historical data. The self-learning computer code is configured to be executed for predicting a time and location for charging the mobile hardware device thereby improving a charging process for the mobile hardware device. Additionally, the self-learning computer code may be configured to be executed for determining charging events typically associated with voltage signal losses between the charging apparatus and the mobile hardware device such that automatically detecting the loss of the voltage signal results from execution of the self-learning computer code.

Figure 3:
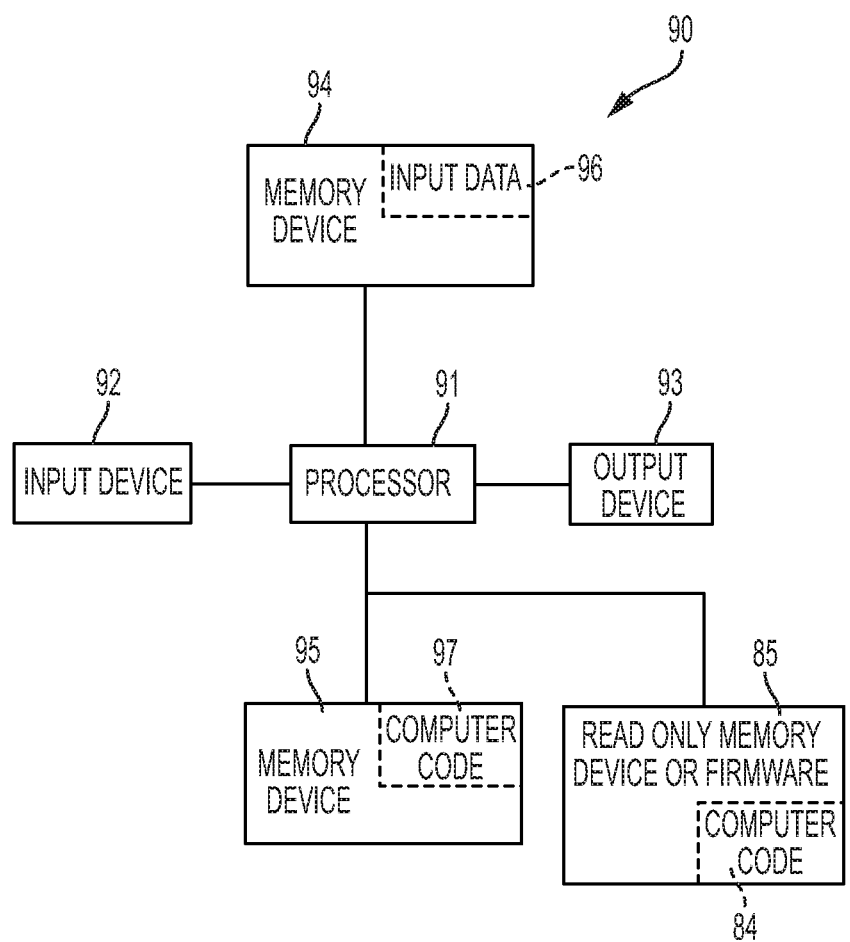
FIG. 3 illustrates a computer system used by the system of FIG. 1 for enabling a process for improving mobile hardware device charging detection technology associated with detecting and correcting voltage signal interruptions via multiple hardware sensors of a mobile hardware device 14, in accordance with embodiments of the present invention.

FIG. 3 illustrates a computer system 90 (e.g., mobile hardware device 14 and hardware devices 21a . . . 21n of FIG. 1) used by or comprised by the system of FIG. 1 for improving mobile hardware device charging detection technology associated with detecting and correcting voltage signal interruptions via multiple hardware sensors of a mobile hardware device 14, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 3 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving mobile hardware device charging detection technology associated with detecting and correcting voltage signal interruptions via multiple hardware sensors of a mobile hardware device 14. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve mobile hardware device charging detection technology associated with detecting and correcting voltage signal interruptions via multiple hardware sensors of a mobile hardware device 14. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving mobile hardware device charging detection technology associated with detecting and correcting voltage signal interruptions via multiple hardware sensors of a mobile hardware device. In another embodiment, the invention provides a business method that performs the process steps of the invention on a subscription, advertising, and/or fee basis. That is, a service supplier, such as a Solution Integrator, could offer to enable a process for improving mobile hardware device charging detection technology associated with detecting and correcting voltage signal interruptions via multiple hardware sensors of a mobile hardware device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
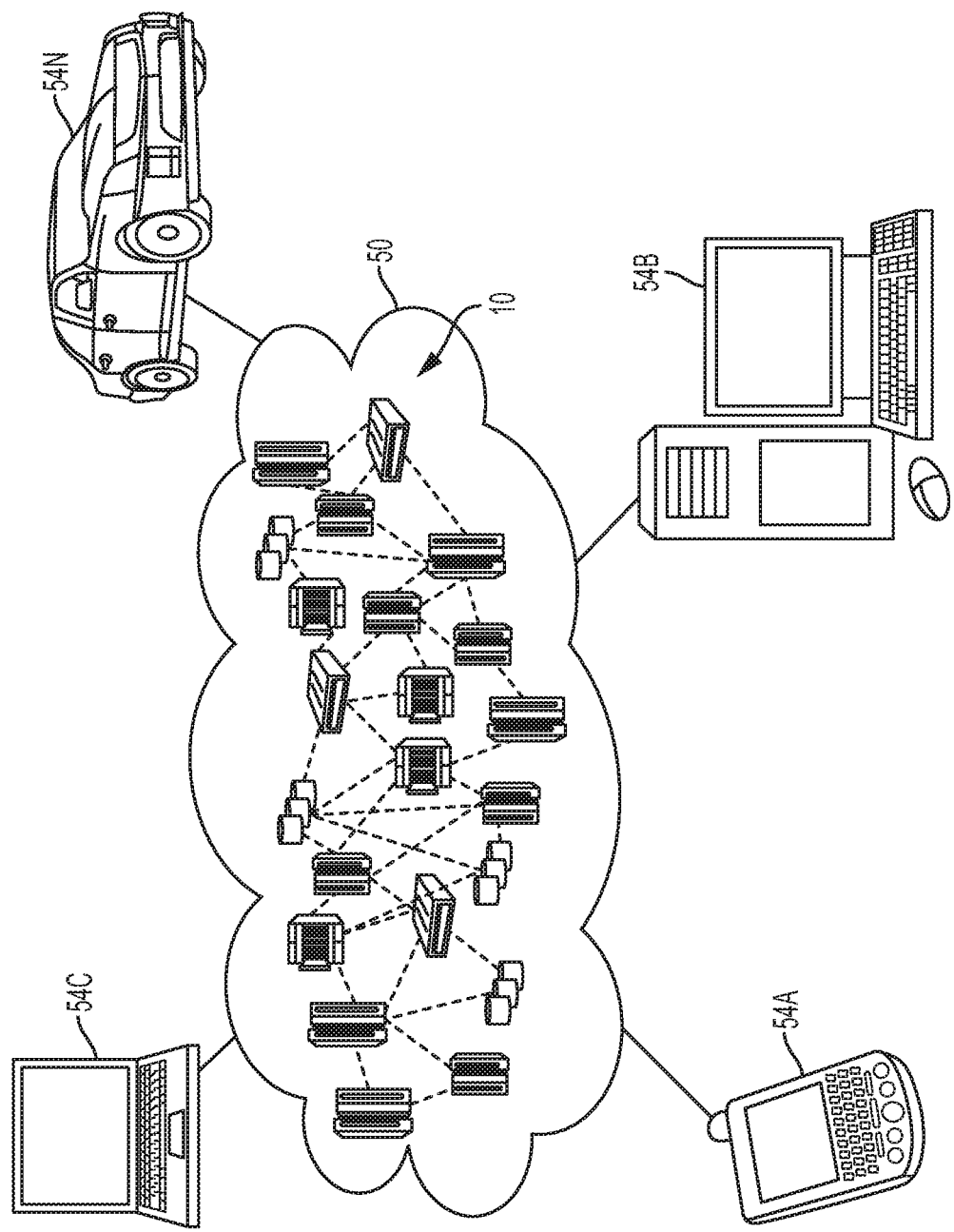
FIG. 4 illustrates a cloud computing environment, in accordance with embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 4 are intended to be illustrative only and that computing nodes 10 and cloud computing environment 50 can communicate with any type of computerized device over any type of network and/or network addressable connection (e.g., using a web browser).

Figure 5:
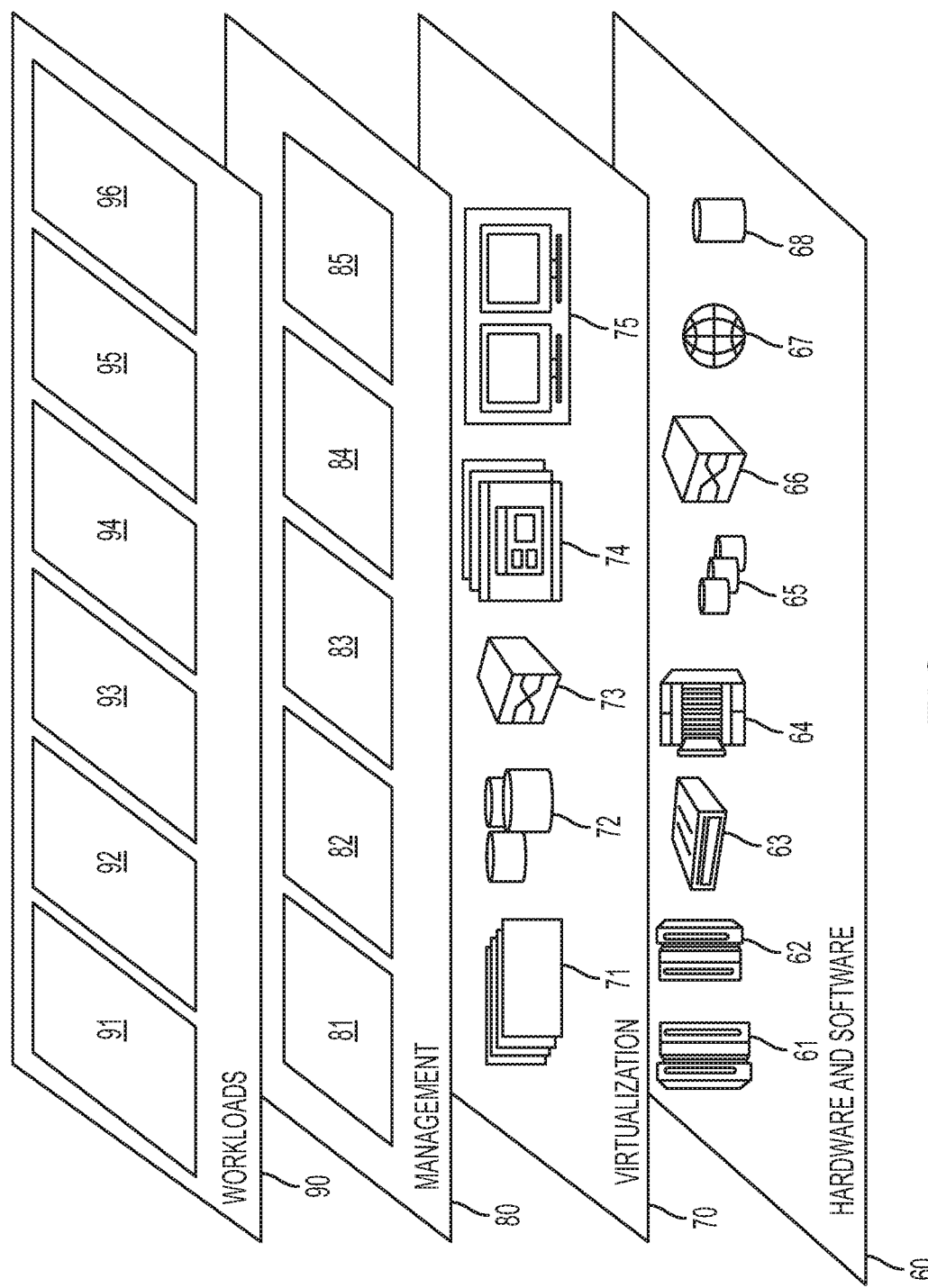
FIG. 5 illustrates a set of functional abstraction layers provided by cloud computing environment, in accordance with embodiments of the present invention.

Referring now to FIG. 5, a set of functional abstraction layers provided by cloud computing environment 50 (see FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving mobile hardware device charging detection technology associated with detecting and correcting voltage signal interruptions via multiple hardware sensors of a mobile hardware device.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated mobile device charging detection improvement method comprising:
   automatically detecting, by a processor of a mobile hardware device of a user, a first connection to a charging apparatus;
   automatically detecting, by said processor via a hardware sensor of said mobile hardware device, a voltage signal between said charging apparatus and circuitry of said mobile hardware device, wherein said hardware sensor comprises a motion sensor for charging attempt detection;
   determining, by said processor, that a specified time period has elapsed since said automatically detecting said voltage signal;
   automatically detecting, by said processor via said hardware sensor of said mobile hardware device, a loss of said voltage signal between said charging apparatus and said circuitry of said mobile hardware device; and
   presenting, by said processor to said user, a notification indicating said loss of said voltage signal between said charging apparatus and said circuitry of said mobile hardware device.

2. The method of claim 1, further comprising:
   detecting, by said processor in response to said automatically detecting said loss of said voltage signal, a wireless charging apparatus located within a charging range of said mobile hardware device;
   disabling, by said processor, a voltage signal path between said charging apparatus and circuitry of said mobile hardware device;
   connecting, by said processor, said wireless charging apparatus to said circuitry of said mobile hardware device; and
   automatically detecting, by said processor via said hardware sensor of said mobile hardware device, a wireless voltage signal between said wireless charging apparatus and said circuitry of said mobile hardware device.

3. The method of claim 1, wherein said notification is presented via said mobile hardware device.

4. The method of claim 1, wherein said presenting said notification comprises:
   automatically connecting, by said processor, said mobile hardware device to an Internet of things (IOT) device of said user; and
   presenting, by said processor via said IOT device, said notification.

5. The method of claim 1, wherein said notification is presented via a presentation means selected from the group consisting of a visual presentation means, an audible presentation means, and a motion based presentation means.

6. The method of claim 1, further comprising:
   determining, by said processor based on results of said automatically detecting said loss of said voltage signal, a faulty connection between said charging apparatus and said circuitry of said mobile hardware device.

7. The method of claim 1, further comprising:
determining, by said processor based on results of said automatically detecting said loss of said voltage signal, that said charging apparatus has been disabled.

8. The method of claim 1, further comprising:
retrieving, by said processor, historical data associated with previous connections between said charging apparatus and said circuitry of said mobile hardware device; and
generating, by said processor based on analysis of said historical data, self learning computer code configured to be executed for predicting a time and location for charging said mobile hardware device thereby improving a charging process for said mobile hardware device.

9. The method of claim 1, further comprising:
retrieving, by said processor, historical data associated with previous connections between said charging apparatus and said circuitry of said mobile hardware device; and
generating, by said processor based on analysis of said historical data, self learning computer code configured to be executed for determining charging events typically associated with voltage signal losses between said charging apparatus and said mobile hardware device, wherein said automatically detecting said loss of said voltage signal results from execution of said self learning computer code.

10. The method of claim 1, wherein said hardware sensor comprises an additional sensor selected from the group consisting of a GPS sensor, an optical sensor, an audio sensor, a voltage sensor, and a temperature sensor.

11. The method of claim 1, further comprising:
providing at least one support service for at least one of creating, integrating, hosting, maintaining, and deploying computer-readable code in the control hardware, said code being executed by the computer processor to implement: said automatically detecting said first connection, said automatically detecting said voltage signal, said determining, said automatically detecting said loss of said voltage signal, and said presenting.

12. A computer program product, comprising a computer readable hardware storage device storing a computer readable program code, said computer readable program code comprising an algorithm that when executed by a processor of a mobile hardware device of a user implements an automated mobile device charging detection improvement method, said method comprising:
automatically detecting, by said processor, a first connection to a charging apparatus;
automatically detecting, by said processor via a hardware sensor of said mobile hardware device, a voltage signal between said charging apparatus and circuitry of said mobile hardware device, wherein said hardware sensor comprises a motion sensor for charging attempt detection;
determining, by said processor, that a specified time period has elapsed since said automatically detecting said voltage signal;
automatically detecting, by said processor via said hardware sensor of said mobile hardware device, a loss of said voltage signal between said charging apparatus and said circuitry of said mobile hardware device; and
presenting, by said processor to said user, a notification indicating said loss of said voltage signal between said charging apparatus and said circuitry of said mobile hardware device.

13. The computer program product of claim 12, wherein said method further comprises:
detecting, by said processor in response to said automatically detecting said loss of said voltage signal, a wireless charging apparatus located within a charging range of said mobile hardware device;
disabling, by said processor, a voltage signal path between said charging apparatus and circuitry of said mobile hardware device;
connecting, by said processor, said wireless charging apparatus to said circuitry of said mobile hardware device; and
automatically detecting, by said processor via said hardware sensor of said mobile hardware device, a wireless voltage signal between said wireless charging apparatus and said circuitry of said mobile hardware device.

14. The computer program product of claim 12, wherein said notification is presented via said mobile hardware device.

15. The computer program product of claim 12, wherein said presenting said notification comprises:
automatically connecting, by said processor, said mobile hardware device to an Internet of things (IOT) device of said user; and
presenting, by said processor via said IOT device, said notification.

16. The computer program product of claim 12, wherein said method further comprises: wherein said notification is presented via a presentation means selected from the group consisting of a visual presentation means, an audible presentation means, and a motion based presentation means.

17. The computer program product of claim 12, wherein said method further comprises:
determining, by said processor based on results of said automatically detecting said loss of said voltage signal, a faulty connection between said charging apparatus and said circuitry of said mobile hardware device.

18. The computer program product of claim 12, wherein said method further comprises:
determining, by said processor based on results of said automatically detecting said loss of said voltage signal, that said charging apparatus has been disabled.

19. The computer program product of claim 12, wherein said method further comprises:
retrieving, by said processor, historical data associated with previous connections between said charging apparatus and said circuitry of said mobile hardware device; and
generating, by said processor based on analysis of said historical data, self learning computer code configured to be executed for predicting a time and location for charging said mobile hardware device thereby improving a charging process for said mobile hardware device.

20. A mobile hardware device comprising a processor coupled to a computer-readable memory unit, said memory unit comprising instructions that when executed by the computer processor implements an automated mobile device charging detection improvement method comprising:
automatically detecting, by said processor, a first connection to a charging apparatus;
automatically detecting, by said processor via a hardware sensor of said mobile hardware device, a voltage signal between said charging apparatus and circuitry of said mobile hardware device, wherein said hardware sensor comprises a motion sensor for charging attempt detection;

determining, by said processor, that a specified time period has elapsed since said automatically detecting said voltage signal;

automatically detecting, by said processor via said hardware sensor of said mobile hardware device, a loss of said voltage signal between said charging apparatus and said circuitry of said mobile hardware device; and presenting, by said processor to a user, a notification indicating said loss of said voltage signal between said charging apparatus and said circuitry of said mobile hardware device.

* * * * *